Oct. 30, 1956  K. I. POSTEL ET AL  2,768,636
POWER TRANSMISSION

Filed Dec. 29, 1952  2 Sheets-Sheet 1

INVENTORS
KENNETH I. POSTEL
WILFRED S. BOBIER JR.
BY
Ralph L. Tweedale
ATTORNEY

Oct. 30, 1956

K. I. POSTEL ET AL 2,768,636

POWER TRANSMISSION

Filed Dec. 29, 1952

*INVENTORS*
KENNETH I. POSTEL
WILFRED S. BOBIER JR.
BY

*Ralph L. Tweedale*

ATTORNEY

United States Patent Office 2,768,636
Patented Oct. 30, 1956

2,768,636

POWER TRANSMISSION

Kenneth I. Postel, Detroit, and Wilfred S. Bobier, Jr., Grosse Pointe Woods, Mich., assignors to Vickers Incorporated, Detroit, Mich., a corporation of Michigan Application December 29, 1952, Serial No. 328,492

11 Claims. (Cl. 137—51)

This invention relates to power transmissions, and is particularly applicable to those of the type comprising two or more fluid pressure energy translating devices, one of which may function as a pump and another as a fluid motor.

More particularly, the invention relates to means for controlling the output speed of such a power transmission. Many industrial processes utilizing hydraulic power require critically controlled rotary speeds, and an object of this invention is to provide a highly sensitive and stable speed control for such a transmission. It should be noted, however, that although the invention is described in conjunction with a power transmission of the fluid pump and motor type, that the invention is generally applicable in the field of rotary speed governing. For example, it may be used for operating the fuel control valve of a combustion engine in response to the output speed of the engine. Speed controlling devices basically include speed sensing means and means for generating a control signal of an order determined by the magnitude of the speed sensed.

It is an object of the present invention to provide improved, low cost, speed sensing mechanism.

More particularly, it is an object to provide speed sensing mechanism having few critical machining tolerances.

A further object is to provide improved means for creating a fluid control pressure modulated as a function of the speed being sensed.

Another object is to provide such a device in which the problem of sealing against fluid leakage is minimized by elimination of hydraulic slip rings, thus simplifying the unit and reducing its cost.

Instability is a frequent fault in speed control systems and results in "hunting," i. e., speed fluctuation at and about the control speed. Such hunting is highly detrimental in a controlled system and to stabilize such a system the speed produced control signal may be modified in an amount and sense determined by the acceleration or deceleration of the controlled member.

It is also an object of this invention to provide improved means for sensing acceleration and modifying a speed produced signal as a function thereof.

In such devices, torsional vibrations of relatively small magnitude may exist which generate false acceleration signals, thus introducing an additional unstabilizing factor. Further, reactive forces created by the acceleration sensing means may produce false signals.

It is therefore an object of the present invention to provide such a device in which the acceleration sensing means is affected only by bona fide acceleration forces, and reactive forces thereon are substantially balanced.

Further objects and advantages of the present invention will be apparent from the following description, reference being had to the accompanying drawings wherein a preferred form of the present invention is clearly shown.

Figure 1:
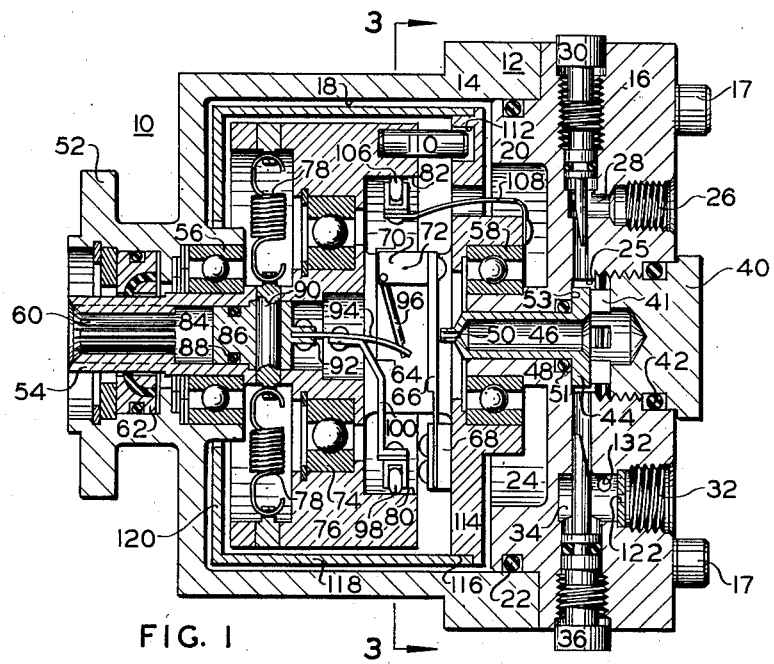
Figure 1 is a longitudinal section of a device embodying the present invention.
Figure 2:
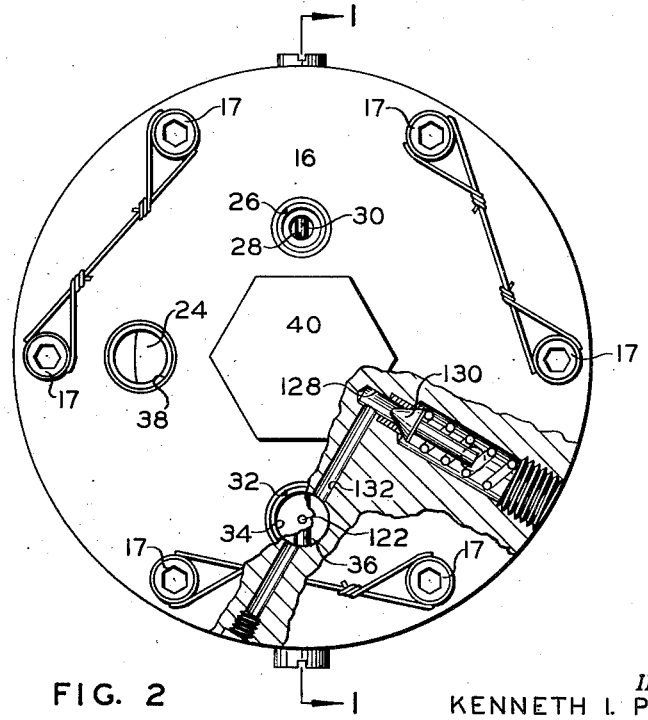
Figure 2 is an end elevation of the device shown in Figure 1.
Figure 6:
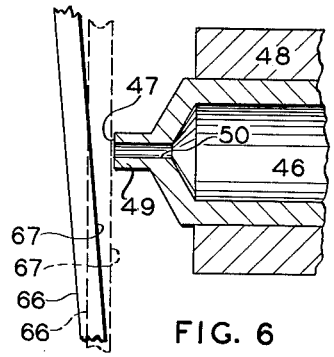
Figure 6 is an enlarged fragmentary view of certain valve components used in the device.

Referring now to Figure 1, the speed control mechanism generally designated 10 includes a housing 12 having a body 14 and a head 16 secured together by a plurality of bolts 17. Body 14 includes a bore 18 into which a pilot 20 on the head 16 extends. An O-ring seal 22 on the pilot 20 insures a fluid-tight juncture between body 14 and head 16. There is thus provided in the housing 12 a central chamber 24. Head 16 has therein three threaded external connection ports. The first of these, designated 26, is in communication with a central bore 25 in head 16 through passage means 28. A needle valve 30 which is externally manually adjustable, provides a variable restriction in the passage 28. The second of the threaded external connection ports is designated 32 and communicates with bore 25 through passage means 34 in the head 16. A second manually adjustable needle valve 36 provides a variable restriction in the passage 34. The last of the three threaded external connection ports is designated 38 and is tapped into head 16 to communicate with chamber 24. A plug 40 is threaded into the outer end of bore 25 and an O-ring seal 42 prevents leakage around the plug. Plug 40 axially contacts the flanged end 44 of a tubular member 46 which extends from bore 25 through a pilot 48 on the head 16 and has a small axial passage 50 communicating with the chamber 24. As can best be seen in Figure 6, passage 50 has its point of emergence from member 46 in the center of the plane radial face 47 of the tip 49. Leakage between the member 46 and the head 16 is prevented by an O-ring seal 51. Flange 44 abuts a shoulder 53 on the head 16, and the axial position of member 46 is adjustable by insertion of shims therebetween. The end of plug 40 is notched at 41 to provide fluid communication between bore 25 and the interior of member 46.

Body member 14 is provided with a mounting flange 52. A drive shaft 54 extends from the housing 12 and is supported therein by a pair of bearings 56 and 58. Bearing 58 is supported on the pilot 48 and it should be noted that the passage 50 is coincident with the axis of rotation of drive shaft 54. Shaft 54 is splined at 60 to permit coupling to any device, the speed of which is to be controlled. A shaft seal 62 prevents leakage from the housing 12 at the point of emergence therefrom of the shaft 54.

Shaft 54 has a central opening 64 therein. A substantially radial support member 66 is secured to shaft 54 at 68, extends across the axis of shaft 54 through opening 64, and carries at its other end an axially offset mass 70. Support member 66 is preferably of a resilient material, such as spring steel, and is disposed with a plane face 67 in axial proximity to the face 47 of tip 49. It can be seen that since the mass 70 is located eccentrically with respect to the axis of rotation of shaft 54 that, during rotation of the shaft 54, centrifugal force will be exerted on the mass 70. Further, since the center of mass 70, indicated at 72, is offset from the axis of the radial support 66, a bending moment will be produced on support 66 which will tend to deflect it axially toward the tip 49 of member 46. Thus, as shown by the dotted lines in Figure 6, the axial clearance between faces 47 and 67 will be reduced and the flow of fluid from passage 50 to the chamber 24 will be restricted. In addition, the degree of such restriction will be proportional to the centrifugal force acting on the mass 70.

There is thus formed a valve for variably restricting flow from the bore 25 to the chamber 24 as a function of the speed of the drive shaft 54. The valve includes a rotary member comprising the radial support 66 and a stationary member comprising the tubular member 46. During normal operation there is always a film of oil between faces 47 and 67, thus preventing mechanical contact and consequently practically eliminating wear on the valve parts. A further major advantage is that no hydraulic slip rings are required even though part of the valve partakes of rotary motion. It is further pointed out that this construction avoids the need for critical machining tolerances such as those utilized in closely fitting valve spools and bores.

Ports 26, 38, and 32 are normally connected, respectively, to a fluid motor adapted to vary the controlled speed, a reservoir, and a source of pressurized control fluid. Thus chamber 25 forms part of a fluid path between a source of control fluid pressure and a reservoir, and is interposed between two restrictions, one manually adjustable and the other automatically variable in response to speed of the drive shaft 54. Speed variation will therefore cause modulation of pressure in chamber 25, which modulated pressure may be conducted from port 26 to actuate a speed controlling motor.

Shaft 54 carries intermediate its ends a bearing 74. Rotatably supported on bearing 74 is an annular inertia member 76. Inertia member 76 is coupled to shaft 54 by a pair of springs 78 which provide a resilient driving connection. Due to the bearing 74, inertia member 76 is freely rotatable relative to shaft 54 except for the centering force of springs 78. When the unit is stopped or running at steady speeds, springs 78 will maintain shaft 54 and inertia member 76 in the normal angular relation illustrated. During acceleration or deceleration, however, the inertia of member 76 will cause it to respectively lag or lead shaft 54 by an amount determined by the magnitude of the acceleration or deceleration.

Inertia member 76 has a pair of diametrically opposed complementary cams 80 and 82 therein. Cam 80 is utilized to modify the speed produced signal on mass 70, and hence support 66, in a sense determined by whether shaft 54 is accelerating or decelerating. Cam 82 is utilized to counteract reactive forces between shaft 54 and inertia member 76 developed by the acceleration compensating mechanism as hereinafter described.

Central bore 84 in the shaft 54 is sealed to prevent leakage from the chamber 24 by a plug 86 having an "O" ring seal 88 therein. The plug 86 is retained in the bore 88 by a transverse pin 90 which extends through the shaft 54. Pin 90 also restrains plug 86 against rotation relative to shaft 54. Plug 86 includes a clevis 92, in which is secured one end of a cantilever spring 94. Spring 94 is slotted at its outer end to receive an articulating link 96 which extends from the spring 94 to a pin connection with the mass 70. The relation of the parts is such that on assembly, spring 94 exerts through link 96 a biasing force on mass 70 in a direction such as to aid centrifugal force thereon.

A cam follower 98 contacts the cam 80 and is supported by an arm 100 which is secured to the cantilever spring 94 intermediate its ends. It can be seen that translatory motion of follower 98 and support arm 100 induced by cam 80 will modify the initial biasing force of spring 94 acting on mass 70.

To compensate speed controlling mechanism for acceleration, the control signal may be modified by an amount determined by the rate of acceleration. For example, as the controlled device approaches the desired speed it may have a very high acceleration rate. In an uncompensated system this would cause overshooting with consequent instability. Thus, if the control signal is modified by acceleration in the same sense it is affected by overspeed, the system's stability will be improved. Conversely, deceleration should modify the control signal in the same sense in which it is affected by underspeed.

The device illustrated is intended for clockwise rotation as viewed from the shaft end. Thus, as can clearly be seen in Figure 3, during acceleration when the inertia member 76 lags behind shaft 54, the cam follower 98, and hence its support arm 100, will be urged inward by the cam 80 thus increasing the initial biasing force exerted on the mass 70 by the spring 94. Conversely, during deceleration, the inertia member 76 will lead shaft 54 and the follower 98 and its support 100 will move radially outward reducing the initial bias exerted by spring 94. The acceleration forces are in this manner sensed and they act on the mass 70 with a net effect such that during acceleration they aid centrifugal force on the mass 70, and during deceleration the net effect is to oppose centrifugal force.

Due to resilience in shafting and pulsations in power application, rotary devices of the type described are subject to torsional vibrations. Sush vibrations are detrimental in that they may have the effect of accelerations and declerations. Acceleration sensing mechanisms responsive to minute fluctuations caused by these torsional vibrations are quite unstable. This invention proposes to eliminate the effect of false acceleration caused by a torsional vibration by the provision of a dwell 102 at the mid-point of cam 80. Dwell 102 is contacted by follower 98 when the shaft 54 and the inertia member 76 are in their normal spring-centered angular relation and is of such an angular extent that torsional vibrations do not cause the cam to induce movement of follower 98.

Figure 5:
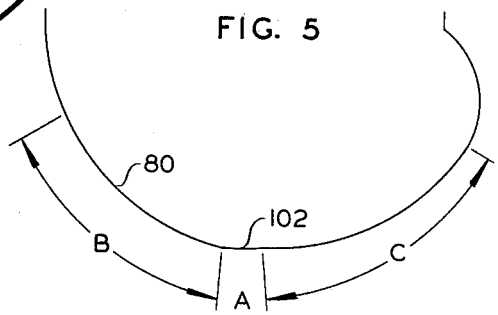
Figure 5 is an enlarged view of a cam contour utilized in the acceleration sensing mechanism.

Referring to Figure 5 there is shown an enlarged view of cam 80. The arcuate extent of the dwell 102 is indicated by the letter "A" and the letters "B" and "C" indicate the arcuate extent of the acceleration and deceleration ramps, respectively. As cam follower 98 moves from dwell "A" out onto the ramp "B," the load of spring 94 on mass 70 is increased as a function of the rate of acceleration, and as it moves out onto the ramp "C" the spring load is decreased as a function of the rate of deceleration.

Figure 3:
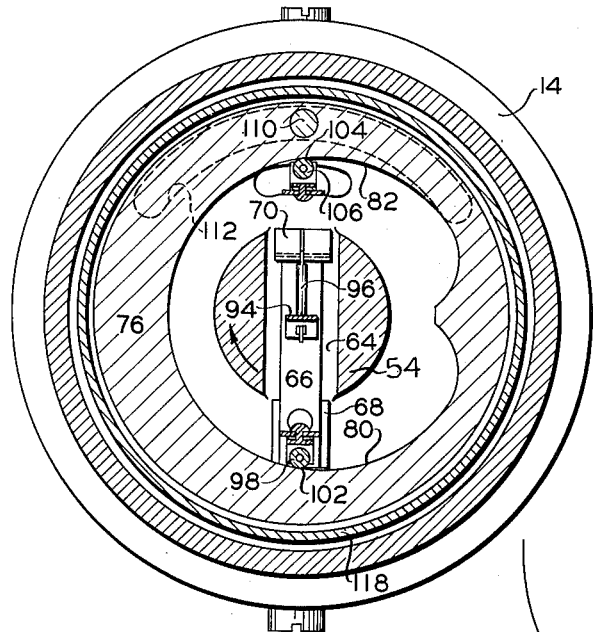
Figure 3 is a section on line 3—3 of Figure 1.

It can be seen that upon relative angular movement between inertia member 76 and shaft 54 causing the cam follower 98 to move off the dwell 102, the force with which follower 98 is biased toward the cam 80 will result in a reaction force between the inertia member and the shaft tending to induce relative rotation thereof. As heretofore mentioned, a second cam 82 is provided in the inertia member 76, which is complementary to cam 80. Cam 82 has a central dwell 104 corresponding to dwell 102 on cam 80. As can be seen in Figure 3, cam 82 is reversed with respect to cam 80, i. e., during relative rotation of shaft 54 and inertia member 76 such as to move cam follower 98 inward, cam 82 will cause outward movement of its follower 106, and vice versa. The follower 106 is biased outwardly against the cam 82 by a leaf spring 108 which is secured to the drive shaft 54. Spring 108 is selected to exert substantially the same force against cam 82 as the spring 94 exerts against the cam 80. Thus, tendencies toward relative rotation between the shaft and the inertia member caused by a reaction between the acceleration sensing cam and follower are substantially eliminated. The mass of followers 98 and 106 and their supporting members should also be so selected as to exert substantially the same centrifugal force on cams 80 and 82.

The amount of relative rotation between shaft 54 and inertia member 76 is limited by a pin 110 extending from the inertia member into an arcuate groove 112 in an outwardly extending flange 114 on the drive shaft. Flange 114 is peripherally grooved at 116 to receive a shroud 118. Shroud 118 surrounds inertia member 76 in close radial proximity thereto and includes an inwardly flanged end 120. The shroud 118, which rotates with shaft 54, insures that the fluid in proximity to inertia member 76 is rotating at approximately the same speed as the inertia member, thus minimizing frictional drag which otherwise would produce a false acceleration signal.

As heretofore described, support member 66 will be positioned to variably restrict communication between bore 25 and chamber 24 as determined by the speed and acceleration of shaft 54. It can be seen that for accurate control, the fluid pressure upstream of the adjustable restriction created by needle valve 36 must be maintained relatively constant. Since a source of control pressure such as might be connected to port 32 might also be used for other purposes in the system such as supercharging, the pressure supplied thereby might be subject to fluctuations. For this reason, there is provided in the passage 34 a restriction 122. A radial drilled passage 128 extends into the head 16 and has therein a spring biased valve 130 subjected to pressure downstream from the orifice 122, conducted thereto by a cross-drilled passage 132 which intersects the passage 34 upstream of the needle valve 36. Restriction 122 acts to damp pressure surges from the source connected to port 32, and valve 130 acts to maintain the fluid upstream of needle valve 36 at a constant pressure.

Figure 4:
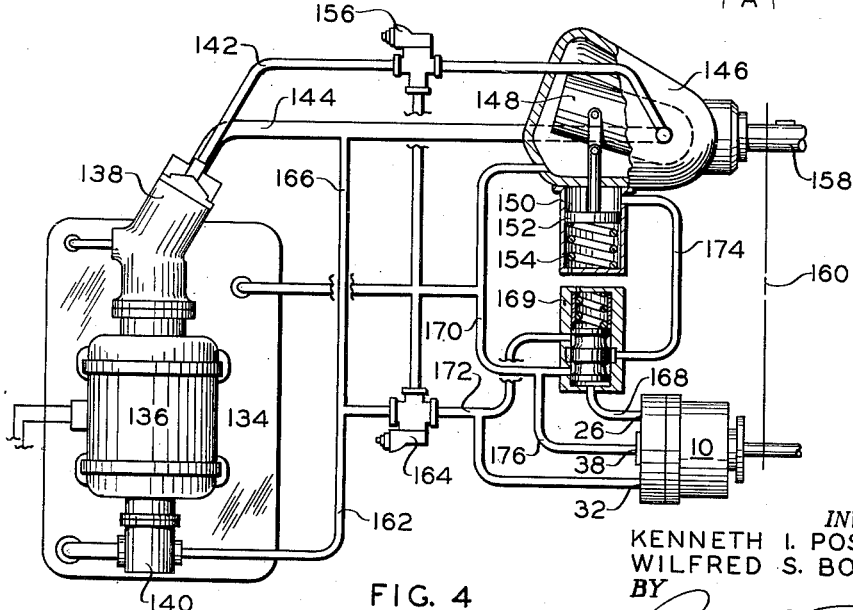
Figure 4 is a schematic diagram of a power transmission incorporating the present invention.

Referring now to Figure 4 there is shown a tank 134 having a prime mover 136 mounted thereon. To one end of the drive shaft of prime mover 136 is connected a fluid pump 138 of the positive displacement piston type. A control pump 140 connects to the opposite end of the drive shaft of prime mover 136. A delivery conduit 142 and a return conduit 144 connect the pump 138 to a fluid motor 146 of the variable displacement type. Motor 146 includes a yoke 148 shiftable to vary its displacement and has a control cylinder 150 affixed thereto having a control piston 152 therein. Piston 152 is biased by a spring 154 to a position such as to induce maximum displacement of motor 146. A relief valve 156 is provided in the delivery line 142.

Motor 146 includes an output or drive shaft 158 which is connectable to a load, the speed of which it is desired to control. The output shaft 158 of motor 146 is drivingly connected to the drive shaft 54 of the speed control mechanism 10 as indicated at 160. A delivery conduit 162 extends from the control pump 140 to port 32 of the speed control device 10. A relief valve 164 prevents generation of excessive pressures, and a branch conduit 166 extends to the return line 144 of the main pump and motor circuit to provide supercharged operation. From port 26 of the speed control mechanism 10 a conduit 168 extends to a pressure operated pilot valve 169. Also connected to the pilot valve 169 are a conduit 170, which leads to tank 134, and a conduit 172, from the control pressure supply conduit 162. Another conduit 174 leads from pilot valve 169 to the control cylinder 150 of motor 146. A conduit 176 connects port 38 of the control mechanism 10 to the tank 134. Pilot valve 169 normally connects conduits 172 and 174 but is operative on increasing pressure in conduit 168 to connect conduits 174 and 170. Pressure supplied to the control cylinder 150 through passage 174 acts on piston 152 in opposition to spring 154 and tends to induce reduced stroke of the motor 146.

In operation, assuming that the system is started from rest, spring 154 will have biased piston 152 and yoke 148 to the maximum displacement position. On energization of prime mover 136, pump 138 will displace fluid through conduit 142 to the motor 146. Due to the large displacement of motor 146 induced by spring 154, the output shaft 158 of motor 146 will initially tend to rotate at a relatively low speed, hence driving speed control 10 at a low speed. As heretofore described, support member 66 in the speed controlling mechanism 10 in its normal position provides relatively unrestricted fluid flow from bore 25 through passage 50 to chamber 24. Thus, substantially the entire pressure drop from the control pressure upstream of needle valve 36 to reservoir pressure will be across needle valve 36, and pressure in bore 25 and hence in port 26 and conduit 168 will be at a low value. Under these conditions, valve 169 will be porting control pressure from conduit 172 to conduit 174, thus inducing reduced stroke and increased speed of motor 146. Increased speed of motor 146, so induced, is reflected in increased speed of control mechanism 10. As heretofore described, increasing speed of control device 10 results in lessening clearance between faces 47 and 67 with consequent restriction of communication between bore 25 and chamber 24. Thus an increasingly greater part of the pressure drop from that above needle valve 36 to tank takes place between faces 47 and 67. Pressure in bore 25 thus increases with increasing speed and acts on pilot valve 169 to vent passage 174 at a predetermined speed to thus maintain the desired speed of motor 146.

Needle valve 36 is adjustable to vary the restriction in the passage 34 to permit regulation of the pressure created in chamber 25 at any particular speed and hence provides for adjustment of the controlled speed of motor 146. For example, increasing the restriction of passage 34 will increase the controlled output speed of motor 146 and the converse is also true.

Needle valve 30 is shiftable to variably restrict passage 28 and permits damping the control signal to produce the desired response characteristics in the system.

Although the embodiment described provides a relatively unrestricted initial communication between bore 25 and chamber 24, which communication is increasingly restricted with increasing shaft speed; if desired, the support 66 may be initially biased so as to block passage 50 and the offset mass so located thereon that centrifugal force creates a bending moment on support 66 so as to lessen the restriction with increasing shaft speed. When such an arrangement is used, increase in shaft speed results in reduced pressure in chamber 24, which pressure drop may be utilized to actuate speed varying mechanism toward reduced speed.

There has thus been provided a low cost, sensitive, and stable speed control which provides fluid control pressure modulated in response to rotary speed and acceleration rates and avoids use of hydraulic slip rings.

While the form of embodiment of the invention as herein disclosed constitutes a preferred form, it is to be understood that other forms might be adopted, all coming within the scope of the claims which follow.

What is claimed is as follows:

1. A valve for variably restricting fluid flow as a function of rotary speed, comprising: a housing; a rotary member mounted in said housing; a stationary member in said housing; means forming a valve port opening in the stationary member; fluid passage means in communication with said opening; and means on the rotary member shiftable in the direction of the axis of rotation of said rotary member in response to speed of the rotary member to variably restrict said opening, said means on the rotary member being located proximate to said opening and including a substantially radial, axially deflectable, support arm carried by said rotary member, and a flyweight axially offset with respect to, and carried by, said support arm to induce deflection thereof in response to speed of the rotary member.

2. A valve for variably restricting fluid flow as a function of rotary speed, comprising: a rotary member having a substantially radial support arm; a stationary member having a substantially radial wall in proximity to said arm; means forming a valve port opening in said wall; fluid passage means in communication with said opening; and a flyweight axially offset with respect to, and carried by, said support arm to induce deflection thereof to cause said arm to variably restrict flow through said opening in response to speed of the rotary member.

3. A valve for variably restricting fluid flow as a function of rotary speed, comprising: a rotary member having a substantially radial support arm; a stationary member having a substantially radial wall in proximity to said arm; means forming a valve port opening in said wall substantially coincident with the axis of rotation of said rotary means; fluid passage means in communication with said opening; and a flyweight axially offset with respect to, and carried by, said support arm to induce deflection thereof to cause said arm to variably restrict flow through said opening in response to speed of the rotary member.

4. A valve for an acceleration compensated rotary speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary means and capable of limited rotation relative to said rotary means; a beam type spring; force transmitting means extending from axially spaced points on said spring to said valving member and to said inertia means; and means for varying the force exerted by said beam type spring in response to said relative rotation.

5. A valve for an acceleration compensated speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary means and capable of limited rotation relative to said rotary means; a cantilever spring; force transmitting means extending from axially spaced points on said spring to said valving member and to said inertia means; and means for varying the force exerted by said cantilever spring in response to said relative rotation.

6. A valve for an acceleration compensated speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary means and capable of limited rotation relative to said rotary means; resilient means exerting a force between the inertia member and the valving member; and means including a cam element and a follower element for varying the force exerted by said resilient means as a function of the degree of said relative rotation, one of said elements being rotatable conjointly with said inertia member and the other rotatable conjointly with said rotary means.

7. A valve for an acceleration compensated speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary means and capable of limited rotation relative to said rotary means; resilient means exerting a force between the inertia member and the valving member; and means for varying the force exerted by said resilient means in response to said relative rotation, said means being ineffective during a small part of the initial relative rotation.

8. A valve for an acceleration compensated speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary means and capable of limited rotation relative to said rotary means; first resilient means exerting a force between the inertia member and the valving member; means for varying the force exerted by said resilient means in response to said relative rotation; second resilient means exerting a force between the inertia member and the rotary means to resist tendencies toward relative rotation therebetween induced by said first resilient means.

9. A valve for an acceleration compensated speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary member and capable of limited rotation relative to said rotary means; resilient means exerting a force between the inertia member and the valving member; and means including a cam on said inertia member and a follower contacting said cam and rotatable with said rotary member for varying the force exerted by said resilient means in response to said relative rotation.

10. A valve for an acceleration compensated speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary means and capable of limited rotation relative to said rotary means; resilient means exerting a force between the inertia member and the valving member; and means including a cam on said inertia member, said cam having a dwell at its normal centered position, and a follower contacting said cam and rotatable with said rotary member, for varying the force exerted by said resilient means in response to said relative rotation.

11. A valve for an acceleration compensated speed regulator for producing a modulated control pressure comprising: fluid passage means; means forming a variable restriction in the passage means; rotary means having a valving member shiftable in response to the centrifugal force thereon to vary said restriction; a rotary inertia member resiliently coupled to said rotary means and capable of limited rotation relative to said rotary means; resilient means exerting a force between the inertia member and the valving member; means including a first cam on said inertia member and a follower contacting said cam and rotatable with said rotary member for varying the force exerted by said resilient means in response to said relative rotation; and means for resisting tendencies toward relative rotation between the inertia member and the rotary member induced by said first resilient means, including a second cam on said inertia member complementary to said first cam, a second cam follower rotatable with said rotary member, and resilient means exerting a force between the rotary member and the second cam follower.

References Cited in the file of this patent

UNITED STATES PATENTS

| 1,509,695 | Volet | Sept. 23, 1924 |
| 1,600,507 | Marr | Sept. 21, 1926 |
| 2,291,011 | Vickers | July 28, 1942 |
| 2,358,894 | Volet | Sept. 26, 1944 |
| 2,485,126 | Wood | Oct. 18, 1949 |
| 2,630,815 | Worthing | Mar. 10, 1953 |
| 2,646,813 | Mueller | July 28, 1953 |